(12) United States Patent
Becker-Asano et al.

(10) Patent No.: US 11,441,923 B2
(45) Date of Patent: Sep. 13, 2022

(54) METHOD FOR DISTRIBUTING NAVIGATION MAP DATA TO A PLURALITY OF WORK MACHINES

(71) Applicant: Robert Bosch GmbH, Stuttgart (DE)

(72) Inventors: Christian Becker-Asano, Kornwestheim (DE); Markus Ferch, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 17/013,012

(22) Filed: Sep. 4, 2020

(65) Prior Publication Data

US 2021/0080284 A1    Mar. 18, 2021

(30) Foreign Application Priority Data

Sep. 17, 2019    (DE) .................. 10 2019 214 115.3

(51) Int. Cl.
*G01C 21/00*    (2006.01)

(52) U.S. Cl.
CPC ..... *G01C 21/3896* (2020.08); *G01C 21/3833* (2020.08); *G01C 21/3859* (2020.08)

(58) Field of Classification Search
CPC ............. G01C 2/3896; G01C 21/3859; G01C 21/3833; G01C 21/3804; G06Q 10/00–30
See application file for complete search history.

(56) References Cited

U.S. PATENT DOCUMENTS

| | | | |
|---|---|---|---|
| 2012/0323431 A1 | 12/2012 | Wong et al. | |
| 2016/0129592 A1* | 5/2016 | Saboo | B25J 9/1661 |
| | | | 700/248 |
| 2018/0364719 A1* | 12/2018 | Wang | G05B 19/41895 |

OTHER PUBLICATIONS

V. Heynitz, H. et al., "Factory of the Future Industry 4.0" KPMG AG, 2016 (68 pages).

* cited by examiner

*Primary Examiner* — Aaron L Troost
(74) *Attorney, Agent, or Firm* — Maginot, Moore & Beck LLP

(57) ABSTRACT

A method for distributing navigation map data to a plurality of work machines which are part of a network of work machines and perform work orders in this network, wherein the navigation map data are needed in the work machines to carry out the work orders, and work orders are planned on the basis of navigation map data, includes detecting work orders for work machines, which work orders exist in the network and were planned on the basis of old navigation map data. The method includes checking the work orders which exist in the network in order to determine whether these work orders can be carried out with new navigation map data, and terminating work orders which cannot be carried out with new navigation map data. The new navigation map data is then installed.

20 Claims, 1 Drawing Sheet

METHOD FOR DISTRIBUTING NAVIGATION MAP DATA TO A PLURALITY OF WORK MACHINES

This application claims priority under 35 U.S.C. § 119 to application no. DE 10 2019 214 115.3, filed on Sep. 17, 2019 in Germany, the disclosure of which is incorporated herein by reference in its entirety.

The present disclosure relates to a work machines (robots) which use map data to navigate.

BACKGROUND

In the "Factory of the Future" vision or Industry 4.0, intelligent robots should operate in an increasingly autonomous and flexible manner. These robots are no longer restricted to a fixed position, like a "robotic arm" for example, but rather can themselves "go" to the place of use and can carry out work there after receiving commands.

The basis of such systems and methods of operation is that robots, in order to perform their tasks at the respective places of use, are always equipped with exact map data which make it possible to navigate the robot. On account of local conditions which regularly change in practice in factories, it is useful to provide functions for updating map data during operation. Changing local conditions which influence map data may arise, for example, as a result of the fact that, in a factory hall described by map data, materials which constitute an obstacle are delivered, produced products are set aside or workstations are regrouped or rearranged. A multiplicity of other possible causes which produce an adaptation of map data are also conceivable.

SUMMARY

On the basis of this, a special advantageous method for distributing map data to a plurality of work machines (robots) is intended to be described.

Localization plays an important role for a so-called mobile robot. In this context, various sub-questions arise. These sub-questions are:
  Where is a robot? This question can also be referred to as determination of a starting position.
  Where is the robot supposed to go to (target position)?
  How does the robot go to the target position? This means the determination of position paths for reaching the target position without collisions.

The guidance of a robot from a starting position to a target position or the position path is primarily intended to be considered here. In particular, methods for guiding a robot shall be described.

In particular, a special advantageous method for distributing navigation map data to a plurality of mobile robots is intended to be described. Advantageous developments are stated in the disclosure. The description, in particular in conjunction with the figures, explains the disclosure and indicates further advantageous embodiment variants. The features mentioned individually in the disclosure can be combined with one another in any desired manner and/or can be specified/replaced with features of the description.

A description is given here of a method for distributing navigation map data to a plurality of work machines which are part of a network of work machines and perform work orders in this network, wherein the navigation map data are needed in the work machines to carry out the work orders, and work orders are planned on the basis of navigation map data, having the following steps of:

a) detecting work orders for work machines, which work orders exist in the network and were planned on the basis of old navigation map data, b) checking the work orders which exist in the network in order to determine whether these work orders can be carried out with new navigation map data, c) terminating work orders which cannot be carried out with new navigation map data, and d) installing new navigation map data.

The described method is a partial aspect of methods used to guide a robot in a production facility. In principle, there are various possible ways of guiding robots in production facilities. One of the possible (conventional) guidance methods for a robot is electromagnetic guidance, wherein metal wires are embedded in the position paths and guidance frequencies are loaded onto the metal wires. The robot is guided along the particular metal wire (position path) to the target position by detecting a particular guidance frequency.

In addition, there is also magnetic guidance and optical guidance. All of this requires a physical marking in the form of colored strips or magnetic tracks or metal wires which must be adhesively bonded to or embedded in the floor. Such guidance methods are accordingly not very flexible. Considerably more flexible guidance methods become possible by virtue of the method for distributing map data which is described here.

Instead of the physical markings, robots can also be guided, for example, on the basis of laser data by means of virtual position paths, wherein the real-time position and direction of travel of a robot can be determined according to the laser data transmitted and/or captured by the robot. As a result, the floor no longer requires any complicated auxiliary devices (for example magnetic tracks). The virtual position path can therefore be flexibly edited depending on requirements and the reason without a large amount of effort. However, such guidance methods require very complicated laser technology.

In principle, guidance on the basis of laser data and virtual position paths already make it possible to edit a virtual position path by means of a computer program on a graphical interface. However, it has been identified that this type of guidance has the difficulty of robots being able to be situated on the position paths to be edited in the performance of their work orders during editing, with the result that a conflict might arise between editing and the performance of orders, which conflict could result in chaotic or undefined states. This applies, in particular, in the case of a large number of robots and work orders.

The method described here enables novel guidance methods which are based on the fact that each robot works on independent map data which are stored in the robot or in a control device assigned to the robot. The described method makes it possible for each work order to have an individual copy of the position path valid at the time of creation in a respective individual copy of map data. Different work orders can therefore be performed with different map data.

During the cyclical performance of the work order, that is to say if it has been determined that the work order is restarted immediately after performance has been terminated, it is up to the user to terminate this old work order at the correct time. The newly created work order valid on the new position path is then allocated to the mobile robot. However, this manual method is associated with an excessive amount of effort in the case of the expected large number of work orders. Therefore, it would be helpful to find a new and efficient solution for at least partially overcoming the restrictions described above.

The advantage of the new robot guidance methods, which are possible with the present method for distributing map data, over the described solutions based on physical markings or laser markings lies in the extensive automation of the change from an old navigation map to a new navigation map. Only the work orders algorithmically affected by the change must be manually adapted and the change from the old system behavior to the new system behavior is automated, thus ensuring that no system fault can occur. In addition, the new method considerably reduces the effort for the user, which will result in better acceptance of the overall system on the market.

The method is carried out, in particular, in an overall system, the method of operation of which shall be explained in more detail here. The overall system comprises a plurality of work machines which must perform work orders in a coordinated manner in a shared environment. The work machines are able to locate themselves via suitable technical systems, for example hardware based on laser navigation.

A "navigation map" which, like a physical map plan, describes virtual position paths is required for self-localization. The at least one navigation map can be algorithmically converted into the form of binary codes and can be transmitted in a data-conducting manner. The at least one navigation map converted into binary codes is hereby referred to as "navigation map data" which are contained in each work order.

After a work order has been received, it is first of all determined which work machine is best suited to performing this work order, and this work order, including the navigation map data, is then distributed to the determined work machine. After receiving this work order, this work machine will itself go to the place of use according to the navigation map data and will perform the work there. The navigation map data are therefore needed in the work machines to carry out the work orders, and work orders are planned on the basis of navigation map data.

Depending on requirements and the reason, the navigation map data can be edited by means of a user interface on a graphical interface. However, it must be absolutely ensured, during editing and the distribution of new navigation maps, in particular in the case of a large number of work machines, that the performance of work orders which are already running is not disrupted and generally no algorithmic problems occur when performing work orders. In particular, work orders which have been dispatched should never be lost.

In order to distribute new navigation map data in a controlled and synchronized manner, the existing work orders for work machines, which work orders have been planned on the basis of old navigation map data, are detected in step a).

For this purpose, the time at which the new navigation map data become valid plays a decisive role. It goes without saying that the work orders planned before this time are based on the old navigation map data and are called the old navigation map data here. All work orders planned after this time are accordingly the new work orders based on new navigation map data. The new work orders are referred to here as active work orders.

After the old work orders have been detected, the ability to carry out the old work orders on the new navigation map data is then checked in step b).

It goes without saying that the new work orders can be carried out with the new navigation maps. However, the old work orders are critical and must be additionally checked here. The reason lies in the structure of navigation map data.

Like a physical map plan, the navigation map data represent a path network which comprises not only the various position paths but also the free areas outside the position paths. Editing usually relates only to particular locations, that is to say only a few particular position paths are intended to be edited. In addition, the respective work machine reaches the place of use only along the best position path. If this position path does not apply to the navigation map data change (editing), the associated work order is not influenced by the editing even though it is based on the old navigation map file. That is to say, such old work orders can be carried out with new navigation map data and are checked in step b). The old work orders which can be carried out with new navigation map data are likewise referred to as active work orders here.

In contrast, the old work orders affected by the change are terminated in step c) because they cannot be carried out with the new navigation map data. It goes without saying that they can be edited under certain conditions in order to adapt the new navigation map data and they can then also be activated.

The new navigation maps can then be installed in step d) by virtue of the new navigation map data being included in each active work order and also being distributed to the corresponding work machines.

In one preferred embodiment, the work machines are transport machines, and the work orders are transport orders.

The work machines may be mobile robots, in particular transport machines for handling the continuous flow of goods. Accordingly, the work orders are the transport orders, according to which the goods are transported from one location to another location. In addition, the transport machines are organized in fleets which must share a physical environment in order to jointly transport the goods as efficiently and economically as possible.

In a further preferred embodiment, the navigation map data each have an identifier, and the work orders each have a list of the identifiers of the navigation map data.

In order to uniquely identify the navigation maps, all navigation map data each have an identifier which is unique throughout the system and was coded, for example, in the form of a predefined binary code. Moreover, each work order comprises a list of identifiers of the navigation map data having at least one identifier. That is to say, each work order comprises at least one navigation map. This work order is guaranteed to be performable on all navigation maps, the identifier of which is included in the list, which is automatically ensured by the described method.

In this case, the identifier of the new navigation map data, for example, can be automatically entered in the list of respective work orders when creating a work order or when editing an old work order which cannot be carried out with the new navigation map data. The identifier of the new navigation map data can also be added to the respective list in the case of the old work orders which can be carried out with the new navigation map data.

In a further preferred embodiment, a defined time for executing the new navigation map data is input before step d).

Depending on requirements and the reason, the time can fundamentally be freely defined after the editing of the navigation map data has been successfully completed. As soon as the user completes the editing, the user is requested by the system to input the time from which the changed navigation map data are intended to be valid, for example immediately. After this time, the work orders are planned on the basis of new navigation map data. Accordingly, the work orders planned before this time are the old work orders described further above.

In a further preferred embodiment, the work orders planned on the basis of old navigation map data are marked in step a).

The work orders detected in step a) are also checked in step b) in order to determine whether they can be carried out with the new navigation map data. If not, they are edited, if appropriate, for adaptation or handled differently. Therefore, they are preferably visually and logically marked for better detection for the further handling processes.

In a further preferred embodiment, the work orders incompatible with the new navigation map data are aborted in step c).

The work orders incompatible with the new navigation map data are the work orders which are created on the basis of old navigation maps and cannot be carried out with the new navigation map data. If they are not edited in the meantime for the purpose of adapting the new navigation map data, they are terminated (deactivated) taking into account the distribution state to work machines.

According to the distribution state, the work orders are also distinguished as distributed and undistributed work orders. The distributed work orders are the work orders which have already been distributed to the work machines and are possibly being performed. In contrast, the undistributed work orders, as the name already states, have only been created and have not yet been distributed to the work machines.

In this case, the work orders which are incompatible with the new navigation maps and have not yet been distributed to the work machines can be automatically deactivated. The work orders which have already been distributed to the work machines, in particular the work orders still being performed, must be deactivated at least after the end of performing the work. The work orders aborted in step c) are referred to here as deactivated work orders (cf. the active work orders).

In a further preferred embodiment, all work orders are stopped before step d) and work orders which have not been completed are continued after step d).

In this case, both the deactivated work orders and the active work orders must be stopped before step d). After step d), the active work orders continue to be performed.

In addition, according to the type of performance, the work orders are also distinguished as non-cyclical and cyclical work orders. The cyclical work orders are those in which, after a work order has been completed, at least one further performance of the same work order is immediately automatically initiated. In this case, both the cyclical work orders and the non-cyclical work orders are stopped before step d) and the cyclical work orders continue to be performed after step d).

In a further preferred embodiment, the work machines are deactivated before step d).

In order to ensure that all work machines no longer perform a work order before step d), all work machines are deactivated before step d). For this purpose, all work machines which are currently not performing any work orders at this time are immediately deactivated. They can be automatically sent to a charging station or a parking position, for example, so that the path network is not blocked.

In one preferred embodiment, the non-cyclical work orders being performed are completed. For this purpose, the affected work machines are accordingly deactivated at the end of performing the work.

In a further preferred embodiment, the cyclical work orders being performed are performed to the end of the respective current entity and are then stopped. That it is say, for all work machines with cyclical work orders, only the entity of the work order currently being performed is completed. Renewed performance of a new entity is prevented.

In a further preferred embodiment, work orders incompatible with the new navigation map data are still completed in step d) on the basis of old navigation map data.

The work orders incompatible with the new navigation map data are the deactivated work orders (cf. active work orders) which are created on the basis of old navigation maps and cannot be carried out the new navigation map data. If they are not edited in the meantime for the purpose of adapting the new navigation map data before step d), they are definitively manually deleted in step d).

In a further preferred embodiment, navigation map data are wirelessly transmitted in step d).

The navigation map data for each work machine are sent to a central server via radio and are merged there in control room software to form an overall image of the situation of the fleet.

Starting from this central server, the navigation map data which are included in work orders can also be transmitted to the work machines via radio.

In a further preferred embodiment, a central control device is designed to control a multiplicity of work machines which are part of a network of work machines.

In this case, the overall system can be controlled by a central control device comprising control room software which controls the work machines on the basis of a path network (also known as navigation graphs) which is specified by the user and on which semantic elements important for the use case (for example charging station, parking station, sources, sinks) have been annotated. In particular, if a transport order is received, the control room software determines which work machine is best suited to performing this order and commands said work machine to execute the order on a preferred route which has been calculated on the basis of the navigation map.

In a graphical user interface which is part of the control room software, the user can check the execution of the work order at any time since the navigation graph is displayed together with the current position of all work machines.

In the same graphical user interface, the user can change over to a "configuration view". This serves the user to edit navigation graphs with a load and save function. In addition, all planned work orders and work orders being performed are displayed thereon with their respective routes (position paths). As a result, the conflicts which result from editing of the navigation map are detected in step b) and are visually (and logically) marked.

BRIEF DESCRIPTION OF THE DRAWINGS

The method for distributing navigation map data to a plurality of work machines is explained in more detail below on the basis of the figures. It should be pointed out that the figures show only preferred exemplary embodiments, to which the disclosure is not restricted here, however. In the drawings.

DETAILED DESCRIPTION

Figure 1:
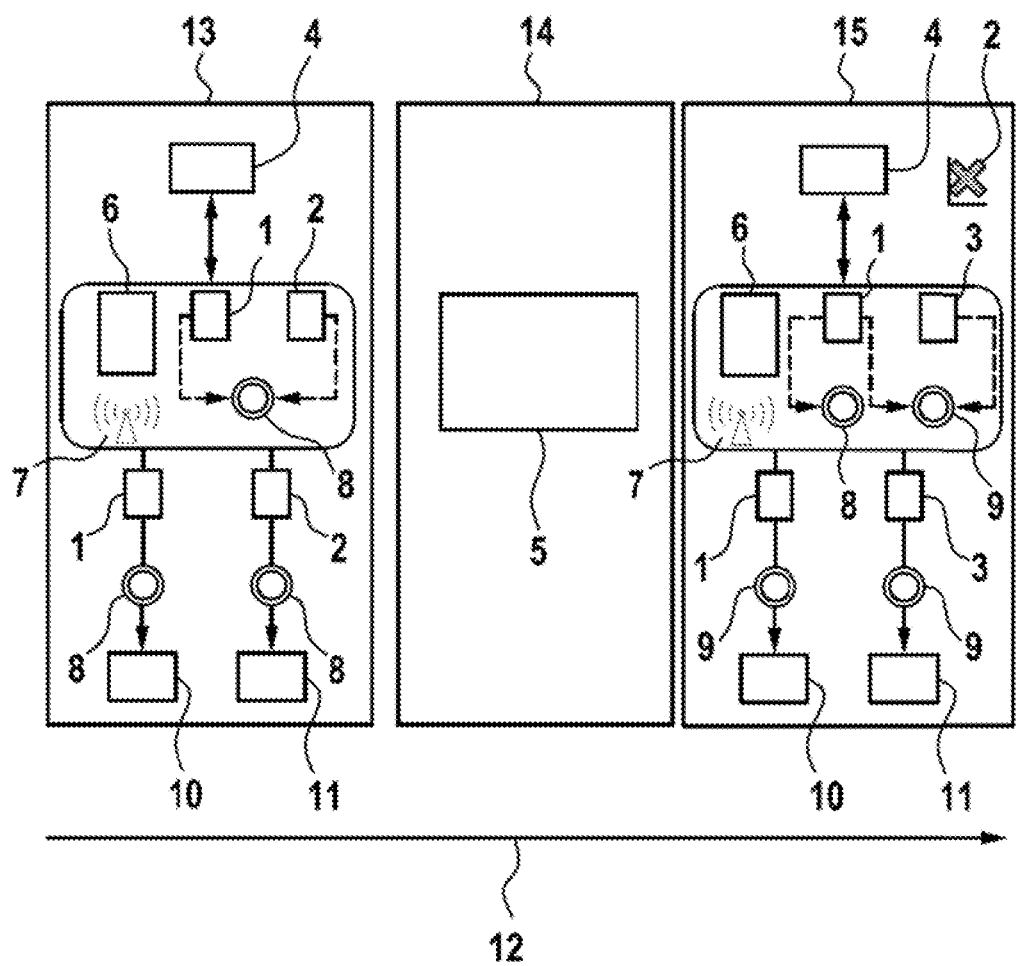
FIG. 1: shows a schematic illustration of the described method

FIG. 1 is a schematic illustration of the described method. Work order (i) 1 and work order (ii) 2, which were planned on the basis of the old navigation map data 8, exist in the time window (i) 13. The control room software 6 transmits the work order (i) 1 to the work machine (i) 10 by means of radio 7 and transmits the work order (ii) 2 to the work machine (ii) 11. The graphical user interface was switched to the live view 4; as a result, the user can check the execution of the work orders (1, 2) at any time since the navigation map is displayed together with the current position of the work machines (10, 11).

In the time window (ii) 14, the graphical user interface is changed over from the live view 4 to the configuration view 5 which serves the user to edit navigation maps with a load and save function. The new navigation map data 9 are created for this purpose.

After the new navigation map data 9 have been created, the new work orders are planned in the time window (iii) 15 only on the basis of the new navigation map data 9. In this case, the graphical user interface is again changed over to the live view 4. All planned transport orders and transport orders being performed are displayed thereon with their respective position paths (routes). As a result, the user can detect conflicts which arise as a result of the creation of the new navigation map data 9. If the work order (ii) 2 planned in the time window (i) 13 is not compatible with the new navigation map data 9, for example, it is deactivated. If the work order (i) 1 planned in the time window (i) 13 is compatible with the new navigation map data 9, for example, it remains active. The work order (iii) 3 created in the time window (iii) 15 is based on the new navigation map data 9 and is therefore also active. The active work orders (1, 3) are distributed, together with the navigation map (ii) 2, to the work machines (10, 11) by means of radio 7. The performance of the work orders (1, 3) can be administered in the live view 4.

Figure 2:
FIG. 2: shows a schematic illustration of the method steps.

FIG. 2 is a schematic illustration of the method steps. In step a), the work orders which were planned on the basis of old navigation map data are detected. For this purpose, the work orders are distinguished as new work orders and old work orders. The new work orders are defined on the basis of the new navigation maps and are referred to here as active work orders. In contrast, the old work orders are defined on the basis of the old navigation map data and are still checked in step b) in order to determine which can be carried out with the new navigation map data. The old work orders which can be carried out with the new navigation map data are likewise referred to as active work orders. The old work orders which cannot be carried out with the new navigation map data are deactivated in step c) if they are not edited in the meantime for the purpose of adapting the new navigation map data before step d). The new navigation maps are then installed in step d) by virtue of the identifier of the new navigation map data being entered or inserted in the list of respective active work orders and the work orders then also being distributed, with the new navigation map data, to the respective work machines. The deactivated work orders can be manually deleted or edited here.

LIST OF REFERENCE SIGNS

1 Work order (i)
2 Work order (ii)
3 Work order (iii)
4 Live view
5 Configuration view
6 Control room software
7 Radio
8 Old navigation map data
9 New navigation map data
10 Work machine (i)
11 Work machine (ii)
12 Time axis
13 Time window (i)
14 Time window (ii)
15 Time window (iii)

What is claimed is:

1. A method of distributing navigation map data to a plurality of work machines which are part of a network of work machines, and which perform work orders in the network, wherein the navigation map data are needed in the plurality of work machines to carry out the work orders, and work orders are planned on the basis of the navigation map data, the method comprising:
    detecting work orders for the plurality of work machines, which work orders exist in the network and were planned on the basis of old navigation map data;
    checking the detected work orders to identify the work orders which can be carried out with new navigation map data;
    checking the detected work orders to identify the work orders which cannot be carried out with the new navigation map data;
    terminating the identified work orders which cannot be carried out with the new navigation map data;
    deactivating the plurality of work machines; and
    installing, after deactivating the plurality of work machines, the new navigation map data in the identified work orders which can be carried out with the new navigation map data after terminating the checked work orders.

2. The method according to claim 1, wherein the plurality of work machines are transport machines, and the work orders are transport orders.

3. The method according to claim 1, wherein the old and new navigation map data each have an identifier, and the work orders each have a list of the identifiers of the old and new navigation map data after installing the new navigation map data in the identified work orders.

4. The method according to claim 1, further comprising:
    inputting a defined time for performing the new navigation map data prior to installing the new navigation map data.

5. The method according to claim 1, wherein detecting work orders for the plurality of work machines further comprises:
    marking the detected work orders.

6. The method according to claim 5, wherein terminating the checked work orders comprises:
    aborting the checked work orders.

7. The method according to claim 1, further comprising:
    stopping the work orders existing in the network before installing the new navigation map data; and
    restarting the identified work orders which can be carried out with the new navigation map data after installing the new navigation map data.

8. The method according to claim 1, wherein deactivating the plurality of work machines before installing the new navigation map data further comprises:
    completing non-cyclical work orders which are being performed by at least one first work machine of the plurality of work machines prior to deactivating the at least one first work machine of the plurality of work machines.

9. The method according to claim 1, wherein deactivating the plurality of work machines before installing the new navigation map data further comprises:
completing a present cycle of cyclical work orders being performed by at least one second work machine of the plurality of work machines prior to deactivating the at least one second work machine of the plurality of work machines.

10. The method according to claim 1, wherein work orders incompatible with the new navigation map data are still completed on the basis of old navigation map data when installing the new navigation map data.

11. The method according to claim 1, wherein installing the new navigation map data comprises:
wirelessly transmitting the new navigation map data to the plurality of work machines having identified work orders which can be carried out with the new navigation map data.

12. A work machine network comprising:
a plurality of work machines; and
a central control device operably connected to the plurality of work machines and configured to
detect work orders for the plurality of work machines, which work orders exist in the network and were planned on the basis of old navigation map data,
check the detected work orders to identify the work orders which can be carried out with new navigation map data,
check the detected work orders to identify the work orders which cannot be carried out with the new navigation map data,
terminate the identified work orders which cannot be carried out with the new navigation map data,
deactivate the plurality of work machines, and
install, after deactivating the plurality of work machines, the new navigation map data in the identified work orders which can be carried out with the new navigation map data after terminating the checked work orders.

13. A method of distributing navigation map data to a plurality of mobile robots configured to perform work orders in which goods are transported from one location to another location in an environment, the navigation map data describing a plurality of paths through the environment along which the plurality of mobile robots may travel to perform work orders, the method comprising:
receiving, with a central control device, new navigation map data including at least one modification the plurality of paths;
identifying, with the central control device, a plurality of work orders for the plurality of work machines that have not yet been completed and which were planned based on navigation map data that is older than the new navigation map data;
identifying, with the central control device, a first set of work orders in the plurality of work orders that can be carried out using the modified plurality of paths in the new navigation map data;
identifying, with the central control device, a second set of work orders in the plurality of work orders that cannot be carried out using the modified plurality of paths in the new navigation map data;
terminating, with the central control device, the second set of work orders that cannot be carried out; and
transmitting, with the central control device, the new navigation map data to those mobile robots of the plurality of mobile robots that have a work order in the first set of work orders that can be carried out.

14. The method according to claim 13, wherein the new navigation map data and each previous navigation map data has a respective identifier and each work order in the plurality of work orders has a list of the respective identifiers after transmitting the new navigation map data.

15. The method according to claim 13, further comprising:
receiving, as a user input, a defined time for transmitting the new navigation map data,
wherein the transmitting the new navigation map data is performed at the defined time.

16. The method according to claim 13, further comprising:
visually marking, in a graphical user interface, the second set of work orders that cannot be carried out.

17. The method according to claim 13, further comprising:
stopping all work orders in the plurality of work orders that are currently being performed by the plurality of mobile robots, before transmitting the new navigation map data; and
restarting performance of any stopped work orders in the first set of work orders that can be carried out, after transmitting the new navigation map data.

18. The method according to claim 13, further comprising:
deactivating the plurality of mobile robots before transmitting the new navigation map data.

19. The method according to claim 18, the deactivating the plurality of mobile robots further comprising:
completing non-cyclical work orders which are being performed by at least one first mobile robot of the plurality of mobile robots prior to deactivating the at least one first mobile robot; and
completing a present cycle of cyclical work orders being performed by at least one second mobile robot of the plurality of mobile robots prior to deactivating the at least one second mobile robot.

20. The method according to claim 13, wherein the second set of work orders that cannot be carried out are still completed based on previous navigation map data before transmitting the new navigation map data.

* * * * *